United States Patent [19]

Sasaki et al.

[11] Patent Number: 4,926,258

[45] Date of Patent: * May 15, 1990

[54] ELECTRONIC ENDOSCOPE APPARATUS CAPABLE OF DRIVING SOLID STATE IMAGING DEVICES HAVING DIFFERENT CHARACTERISTICS

[75] Inventors: Masahiko Sasaki; Masao Uehara; Masahide Kanno; Shinji Yamashita; Katsuyoshi Sasagawa, all of Hachioji; Jun Hasegawa, Hino; Katsuyuki Saito; Akinobu Uchikubo, both of Hachioji, all of Japan

[73] Assignee: Olympus Optical Co., Ltd., Tokyo, Japan

[*] Notice: The portion of the term of this patent subsequent to Mar. 28, 2006 has been disclaimed.

[21] Appl. No.: 255,228

[22] Filed: Oct. 11, 1988

[30] Foreign Application Priority Data

Oct. 20, 1987 [JP] Japan .................................. 62-266061
Apr. 7, 1988 [JP] Japan .................................. 63-86377

[51] Int. Cl.[5] .......................... H04N 7/18; A61B 1/06
[52] U.S. Cl. .......................................... 358/98; 124/6
[58] Field of Search .................. 358/98, 213.26; 128/4, 128/6

[56] References Cited

U.S. PATENT DOCUMENTS

| 4,667,229 | 5/1987 | Cooper et al. | 358/98 |
| 4,737,841 | 4/1988 | Kinoshita et al. | 358/213.26 |
| 4,816,909 | 3/1989 | Kimura et al. | 358/98 |

FOREIGN PATENT DOCUMENTS 61-156962  7/1986  Japan .
61-156968  7/1986  Japan .
62-127167  8/1987  Japan .

Primary Examiner—John K. Peng
Attorney, Agent, or Firm—Armstrong, Nikaido, Marmelstein, Kubovcik & Murray

[57] ABSTRACT

An apparatus has a simple configuration using a drive circuit for outputting horizontal transfer clocks with a given frequency regardless of the number of picture elements of a solid state imaging device which constitutes an imaging means of an endoscope and the reading structure thereof so that it can be used for an endoscope having a different number of picture elements.

32 Claims, 15 Drawing Sheets

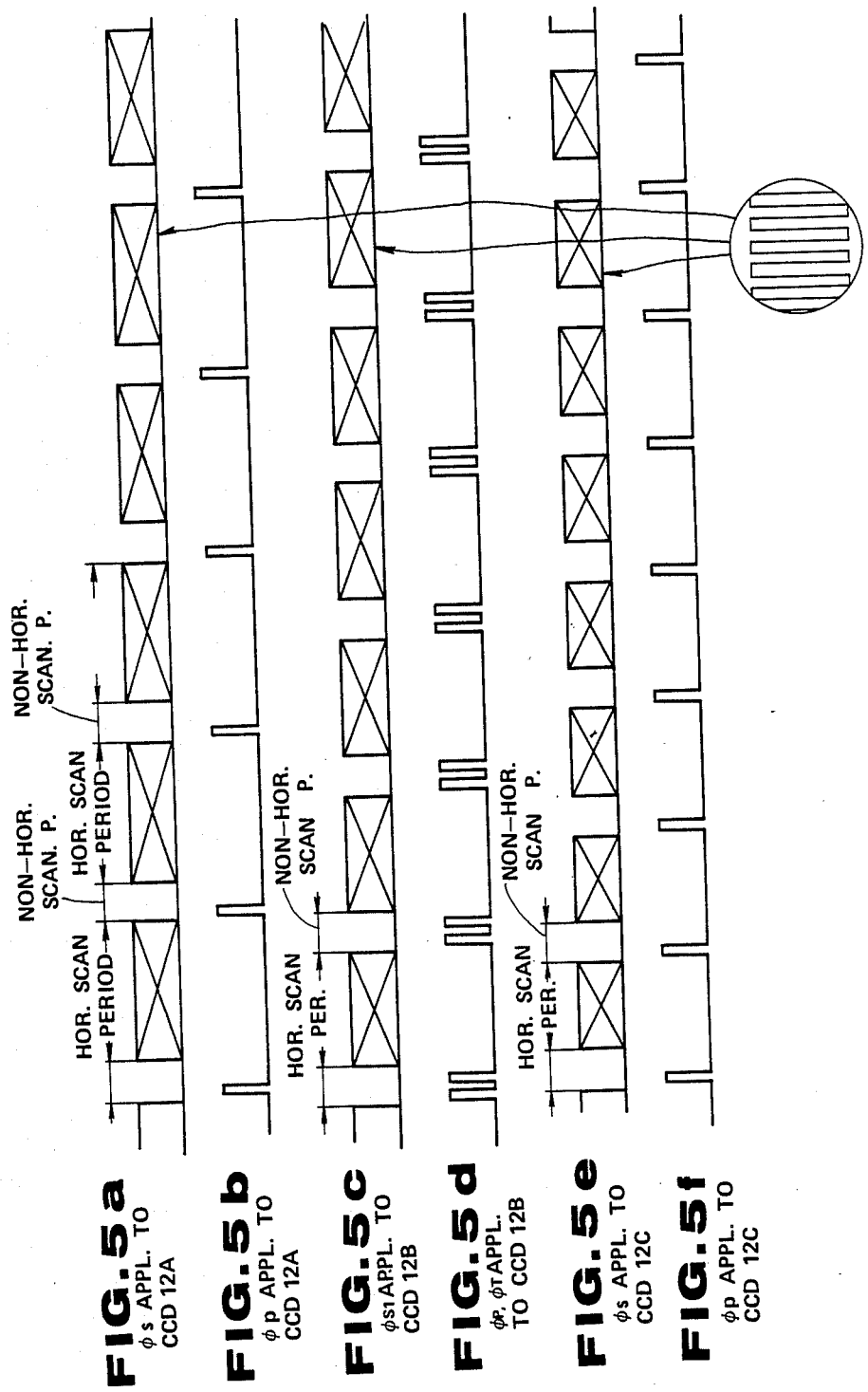

FIG.7
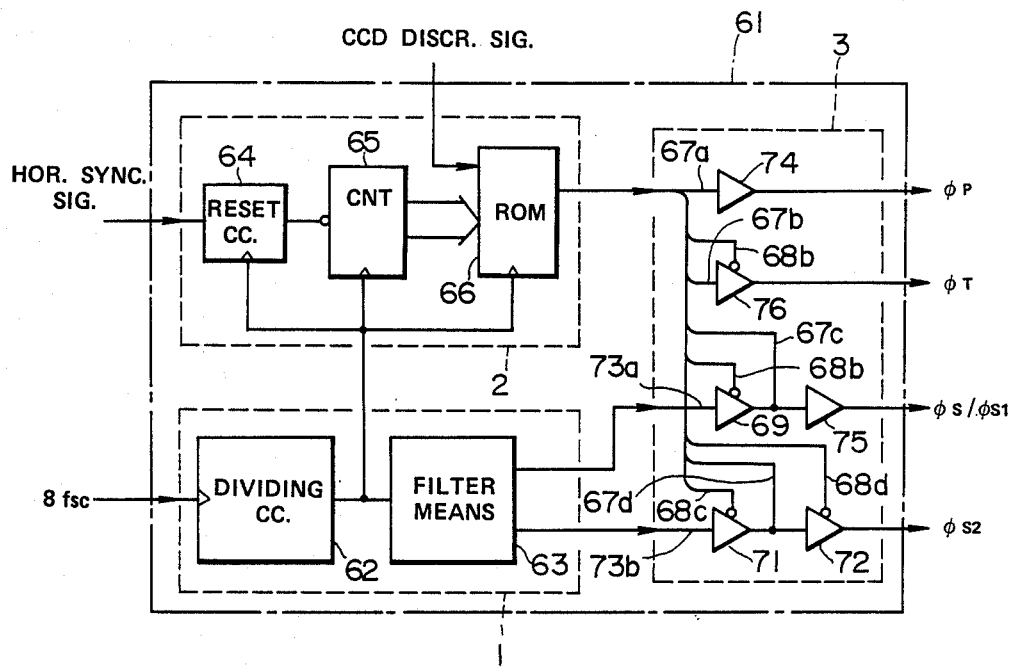
FIG.8a
SIG. 73a
FIG.8b
SIG. 68b IN CASE OF CCD 12A
FIG.8c
SIG. 68b IN CASE OF CCD 12B
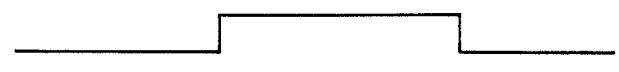
FIG.8d
SIG 67c IN CASE OF CCD 12A
FIG.8e
SIG. 67c IN CASE OF CCD 12B
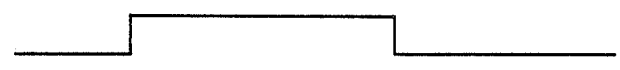
FIG.8f
φs IN CASE OF CCD 12B
FIG.8g
φs IN CASE OF CCD 12B

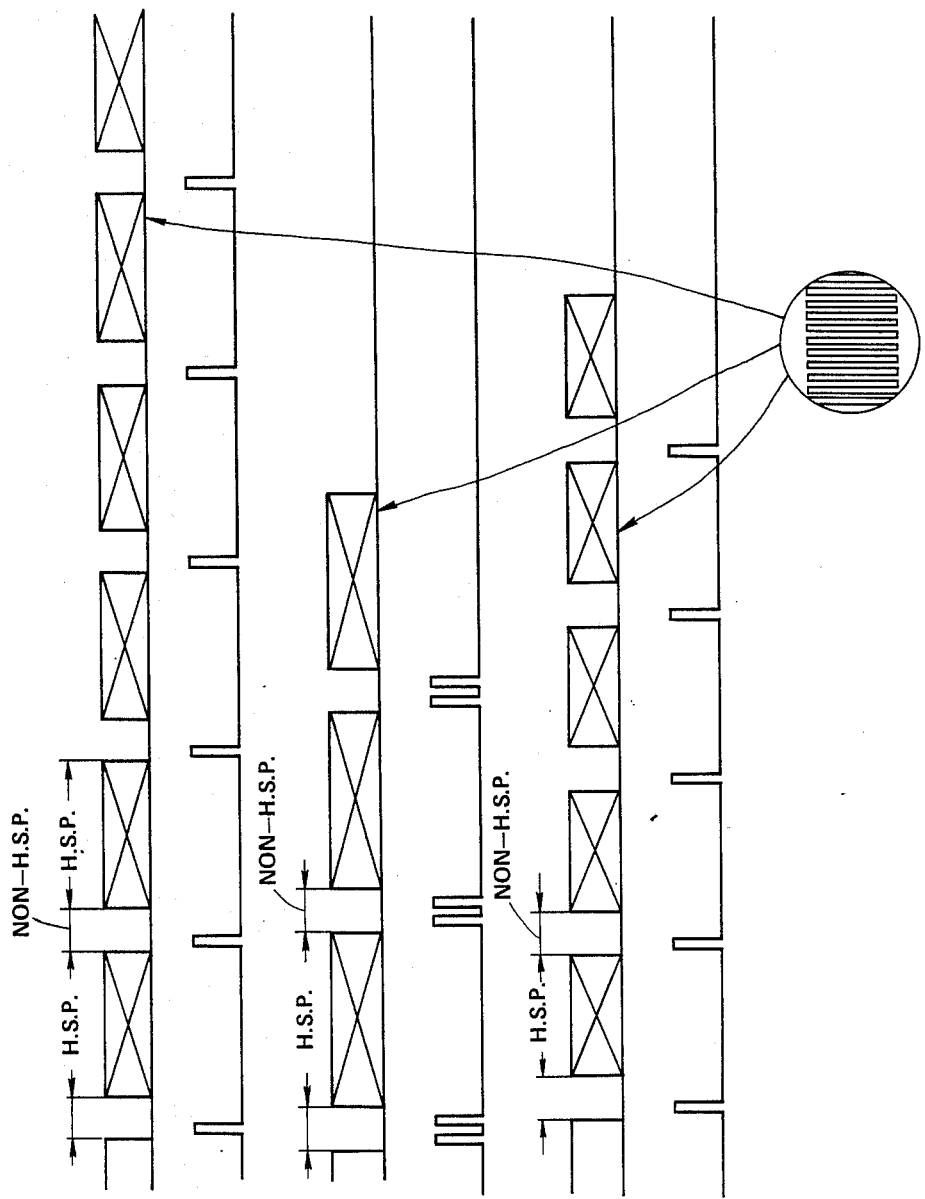

HOR. SCAN. SIG.

R. SIG. DUE TO CCD 12A

R. SIG. DUE TO CCD 12C

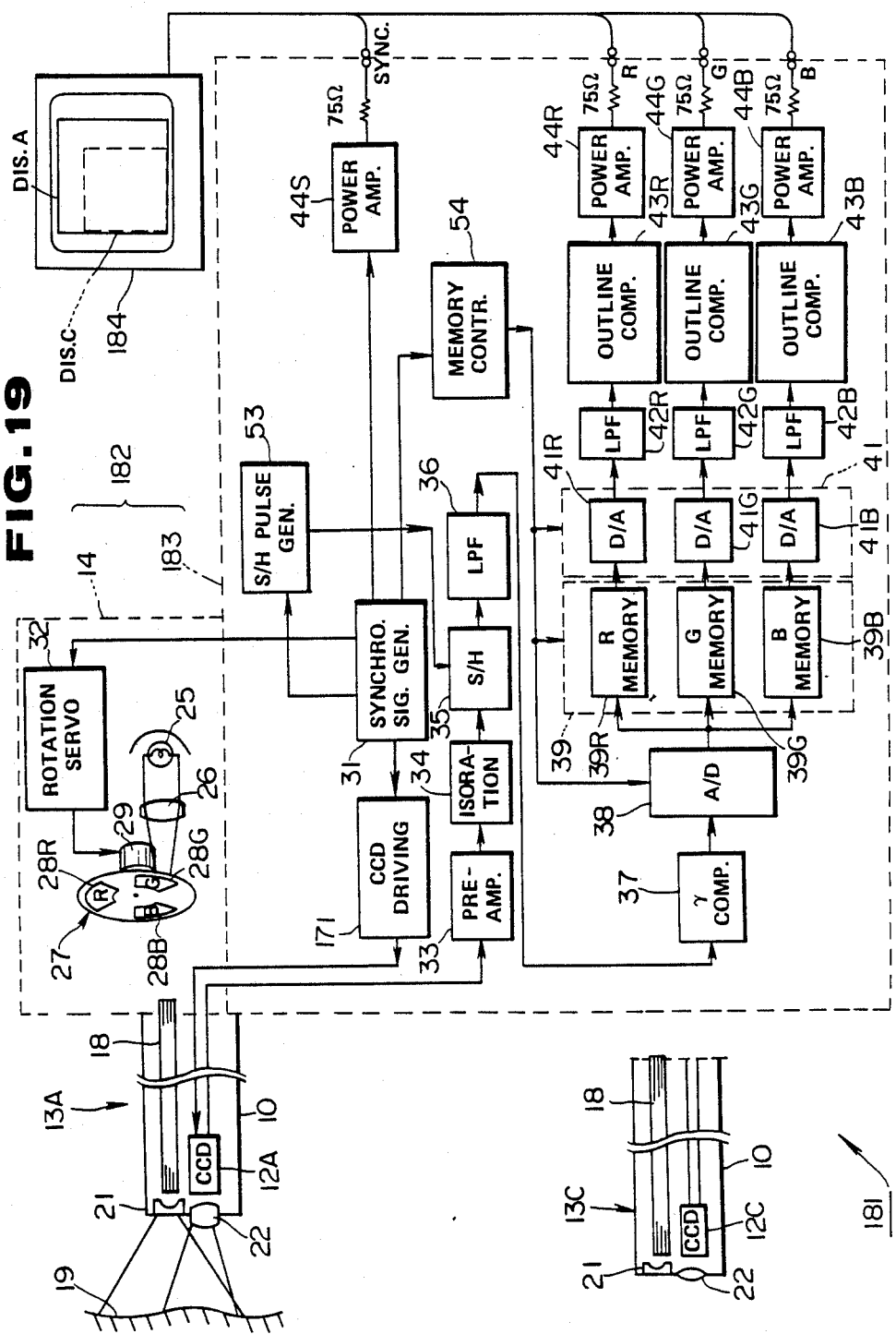

ELECTRONIC ENDOSCOPE APPARATUS CAPABLE OF DRIVING SOLID STATE IMAGING DEVICES HAVING DIFFERENT CHARACTERISTICS

BACKGROUND OF THE INVENTION

Field of the Invention and Related Art Statement

The present invention relates to an electronic endoscope apparatus which utilizes a horizontal drive clock signal with a given frequency for solid state imaging devices having different numbers of picture elements.

Image pickup apparatus using solid state imaging devices such as CCD (charge coupled device) and the like have recently been used in a wide range of applications.

Electronic endoscopes (referred to as "electroscope" hereinafter) using solid-state image pickup devices such as CCD and the like to convert images to electrical signals for transmission have been brought into practical use in the field of endoscopes in place of conventional endoscopes (referred to as "fiberscope" hereinafter) which utilizes optical image guides for transmitting optical images.

The versatility of application of endoscopes and electroscopes and the variety in size and shape terms of the regions into which they are inserted has lead to the development of endoscopes with insertion portions of various sizes and shapes in accordance with the intended application. Thus, the solid state imaging devices which are mounted at the ends of the insertion portions of electroscopes have different sizes, i.e., different numbers of picture elements, in accordance with the types of endoscopes being used.

An endoscope apparatus of the prior art comprises an electroscope of the above-described type, a signal processing unit, a monitor unit and a light source unit and involves the problem that only electroscopes using solid-state imaging devices of the same kind and specification can be used because the drive circuits and the signal processing circuits for the solid-state image pickup devices are fixed.

In consideration of the aforementioned problem, the assignee of the present invention applied for a patent as disclosed in Japanese Patent Laid-Open No. 164433/1987 in which individual electroscopes containing an oscillator and a driving pulse generating circuit are made capable of being connected to a common apparatus body before use. This invention involves a problem, however, in that the size and cost of each of the individual electroscopes are increased because each of them has to contain an oscillator and drive circuit.

The assignee also applied for a patent as disclosed in Japanese Patent Laid-Open No. 213387/1987 in which a detachable drive pulse generating unit is used in an apparatus body that accommodates a video processor so that scopes incorporating different types of solid state imaging device can be used with a common apparatus. This invention, however, requires the preparation of various units corresponding to the various type of scope and, when many kinds of scopes are used, the management of these units becomes a complicated task, while the possibility that a unit which does not suit a particular scope may be mistakenly used is also involved. Thus some room for improvement still remains.

On the other hand, there is a problem in that the concentrations of impurities in channel regions for transmitting signal charges which are generated by the photoelectric conversion effected by photodiodes which comprises respective picture elements become non-uniform as the packing density of a solid state imaging device is raised. A driving method designed to deal with this problem was thus proposed in Japanese Patent Laid-Open No. 156962/1986. In this prior art, in a driving mode in comprising alternate periods of transmission of signal charges and periods of stoppage when there is no transmission of signal charges, a pulse with a low frequency is first input and transmission is then started during the transition from the periods of stoppage to the transmission periods. This allows black spot damage produced by the non-uniformity of a diffusion layer of impurities in the transmission channel to be reduced. In other words, individual solid state imaging devices having different numbers of picture elements sometimes involve problems that are unique to each, and, as shown in the example described in Japanese Patent Laid-Open No. 156968/1986. a situation can be envisage in which drive modes with subtle differences as between the respective devices will become necessary if these unique problems are to be solved.

A configuration was proposed in Japanese Utility Model Laid-Open No. 127167/1987 in which a driving pulse for an imaging device and a control signal for processing an image signal are produced by using PROM so that merely the changing the data of the PROM enables correspondence with any change in the specification of the imaging device or the apparatus which utilizes the device. In this invention, however, when an imaging device having a different specification is used, the PROM is changed to another PROM in which data in agreement with the imaging device used is written. Therefore, when this invention is applied to the field of the present application, the operation becomes complicated because the imaging device being used frequently has to be changed. In this invention, since the driving signal for the imaging device is generated by the PROM, the noise component produced by inputting an address for the driving of the PROM becomes mixed with the drive signal and thus in some cases produces fixed pattern noise in the image signal formed. In other words, when a plurality of address inputs are started or stopped, spike-like noise occurs in the power source line or signal line of a PROM IC, and thus a component with a frequency of $\frac{1}{2}^n$ of the basic frequency of the driving signal produced by the PROM is superposed on the driving signal formed by the PROM, with the H and L levels of the drive signal being periodically changed. It is thought that the presence of a periodic change in level in the driving signal for the imaging device will have an influence on the efficiency of transmission of signal charges, and fixed pattern noise having the form of longitudinal stripes or a lattice form will occur in the resulting image.

A fiberscope equipped with a television camera containing a solid state imaging device has a function which is substantially the same as that of an electroscope, it is preferable to enable the fiberscope to be used in the same way as in the electroscope.

OBJECT AND SUMMARY OF THE INVENTION

It is an object of the present invention to provide an electronic endoscope apparatus which can be used for any electroscopes that utilize solid state imaging devices having different numbers of picture elements or that employ different driving methods.

It is another object of the present invention to provide an electronic endoscope apparatus which can be used with a simple configuration and in a simple operation.

It is a further object of the present invention to provide an electronic endoscope apparatus which can be used for a fiberscope in which a television camera containing a solid state imaging device is mounted in the same way as in electroscopes.

FIG. 1 shows the fundamental configuration of a principal portion of a means for driving solid state image pickup devices (not shown) in an electronic endoscope apparatus comprising a plurality of electroscopes which use as image pickup means the solid state image pickup devices having different numbers of picture elements or employing different drive methods, and of an apparatus body which can be used for all of these electroscopes. This means comprises a first driving clock generating means 1 which generates a driving clock having a given frequency during the horizontal scanning time of each of the imaging devices regardless of the number of picture elements of each device or the driving methods thereof, a second driving clock generating means 2 which is capable of changing the driving clock during periods other than the horizontal scanning time of each of the devices in correspondence with the number of picture elements of the relevant imaging device or the driving method thereof, and a driving signal mixing means 3 which mixes the output from the first and second driving clock generating means 1, 2 in correspondence with the number of picture elements of the relevant device or the driving method thereof so that the output accords with the relevant number of pixels or the driving method concerned, this driving signal mixing means 3 outputting a signal 4 for driving each of the imaging devices. The first driving clock generating means 1 outputs a clock signal 5 to the second driving clock generating means 2, as well as outputting a driving clock signal 6 during the horizontal scanning time to the driving signal mixing means 3. A synchronizing signal 7 and an imaging device discriminating signal 8 are input in the second driving clock generating means 2 which generates a driving clock 9 during periods other than the horizontal scanning time and outputs it to the driving signal mixing means 3. The driving clock signals 6, 9 from the first and second driving clock generating means 1, 2 and the discriminating signal 8 are input in the driving signal mixing means 3. The first and second driving clock signals 6, 9 are mixed by using the discriminating signal 8 to produce the imaging device driving signal 4.

BRIEF DESCRIPTION OF THE DRAWINGS

FIGS. 1 to 6 show a first embodiment of the present invention, in which

FIG. 1 is a block diagram of the fundamental configuration of a CCD drive circuit of the first embodiment, FIG. 2 is a block diagram of an electronic endoscope apparatus of the first embodiment, FIG. 3 is a drawing of a typical circuit of a CCD discriminating circuit, FIGS. 5a-5f represent timing charts showing the driving signals output from the CCD drive circuit, and FIG. 6 is a typical block diagram of the CCD drive circuit;

FIG. 7 is a typical block diagram of a CCD drive circuit of a second embodiment of the present invention;

FIGS. 8a-8g show timing charts which assist to explain the operation of the second embodiment;

FIGS. 15a-15f show timing charts of driving signals in a modified example of the first embodiment of the present invention;

FIG. 19 is a block diagram of an electronic endoscope apparatus of the eighth embodiment;

DETAILED DESCRIPTION OF PREFERRED EMBODIMENTS

Figure 2:
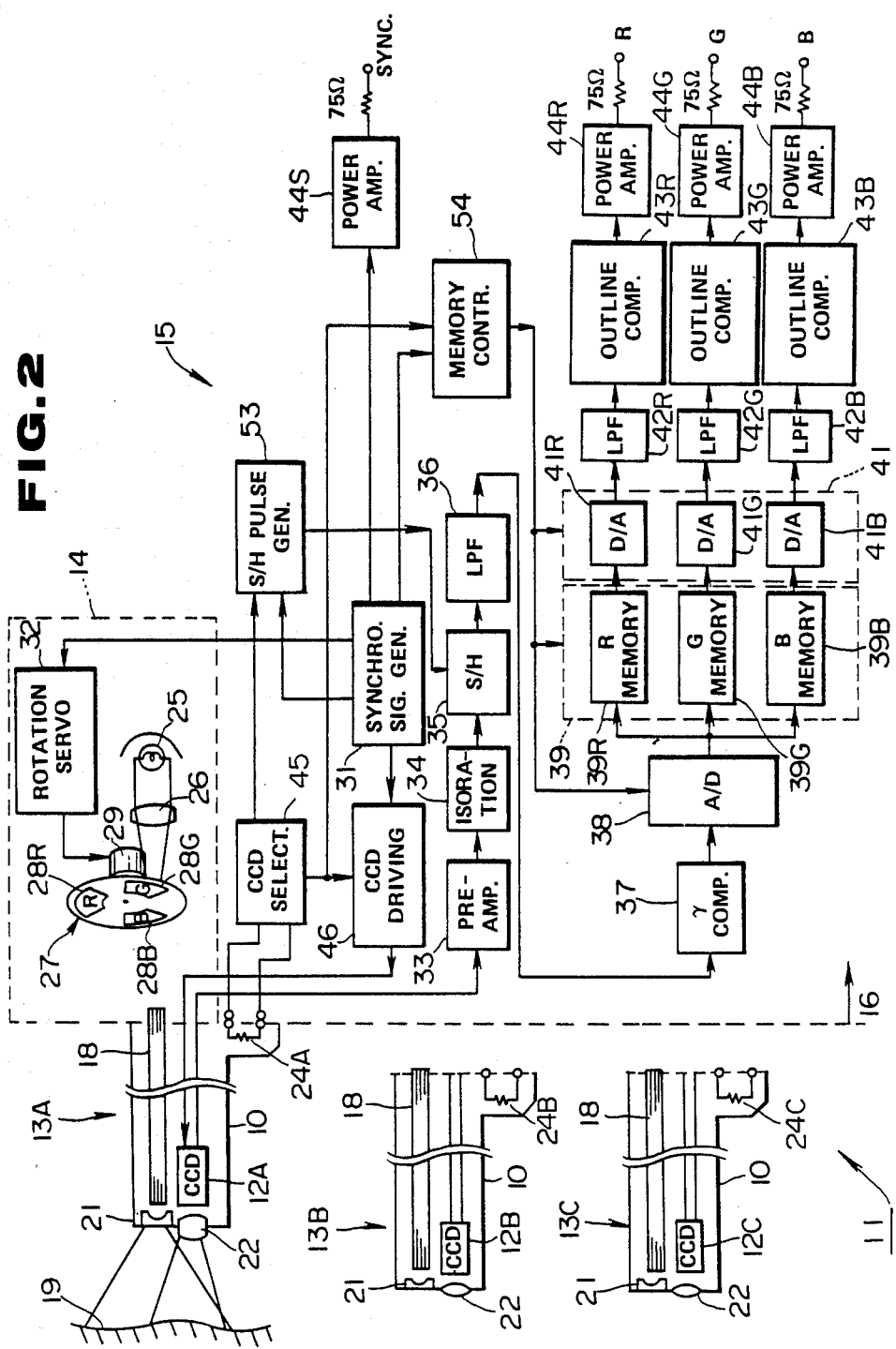

As shown in FIG. 2, an electronic endoscope apparatus 11 of a first embodiment comprises electroscopes 13A, 13B, 13C which respectively use as imaging means solid state imaging devices (CCD in this embodiment) 12A, 12B, 12C having different numbers of picture elements or employing different driving methods; an apparatus body 16 which has a light source unit 14 for supplying RGB sequential light to each of the electroscopes 13I (I=A, B, C) connected thereto, and a signal processing unit 15 for driving the imaging means of each of the electroscopes 13I and processing the imaging signals therefrom; and a monitor (not shown in the drawing).

Each of the electroscopes 13I has an insertion portion 10 which is formed with a long thin shape so as to be easily inserted into a cavity of the human body and a light guide (LG) 18 which is made of a bundle of optical fibers and which is passed therethrough. This light guide 18 serves to transmit illuminating light supplied to the incidence surface at its one end and to illuminate a subject 19 through an illuminating lens 21 from the projection surface provided at its other end. The imaging means comprising an objective lens 22 and CCD 12I is also provided at this end. A resistance 24I whose value depends upon the type of CCD 12I mounted in each of the electroscopes 13I is incorporated in a connector unit between the apparatus body 16 and each of the electroscopes 13I so that the apparatus body 16 can discriminate the type of CCD 12I being used by reading the value of the resistance.

The light source unit 14 of the apparatus body 16 serves to supply the white light generated from a light source lamp 25 as illuminating light to the incidence surface at the end of the LG 18 of each of the electroscopes 13I through a condensing lens 26 and an RGB rotary filter 27 which is provided in the light path.

The light source lamp 25 utilizing a white light source such as a xenon lamp. The RGB rotary filter 27 is provided with three color transmission filters 28R, 28G, 28B which solely permit passage of light having the wavelengths of R, G, B types of light, respectively, and which are each inserted in turn into the path of illuminating light by rotation of the rotary filter 27 so that RGB types of sequential light are supplied to the LG 18. The RGB filters 28R, 28G, 28B are provided in the rotary filter 27 with given spaces therebetween and shield times in which no light is supplied are thus provided between the RGB types of sequential light. During these shield times, the signal charges of the CCD 12I are read. The rotary filter 27 is rotated by a motor 29 and the number of rotation thereof is controlled to accord with a given value by means of a rotation servo 32 which utilizes as its control input a synchronizing signal from a synchronizing signal generator 31 in the signal processing unit 15. For example, in the case of NTSC, the rotary filter 27 is so controlled as to make one turn in approximately 1/30 second (1 frame time).

The optical image of the subject 19 which is illuminated by the RGB types of sequential illuminating light generated by the light source unit 14 is converted into electrical signals by the imaging means of each of the electroscopes 13I and is then transmitted as surface sequential light of RGB colors (RGB sequential image signals) to the signal processing unit 15 of the apparatus body 16. The output signal from each of the CCD 12I is amplified by a pre-amplifier 33 and is then input to an S/H circuit 35 through an isolation circuit 34 provided to protect patients and operators undertaking examination from any accident such as electric shocks. After carrier components have been removed from the surface sequential signals of RGB colors by the S/H circuit 35 and unnecessary harmonic components have been removed therefrom by an LPF (low-pass filter) 36, the sequential signals are input to an A/D converter 38 through a γ-compensating circuit 37, subjected to analog-to-digital conversion and then stored in turn in a memory 39. In other words, the RGB image signals which are read by the CCD 12I synchronously with the rotation of the rotary filter 27 are successively subjected to A/D conversion during the time of one frame and then respectively stored in memories 39R, 39G, 39B.

The RGB image signals which are respectively stored in the memories 39R, 39G, 39B are simultaneously read in synchronism with the TV synchronizing signals supplied from a synchronizing signal generator 31, and respectively subjected to digital-to-analog conversion in three D/A converters 41R, 41G, 41B which form a D/A converter 41. After unnecessary harmonic components have been removed by LPFs 42R, 42G, 42B, the RGB image signals are respectively input to outline compensating circuits 43R, 43G, 43B. The RGB image signals which are respectively subjected to outline compensation in the outline compensating circuit 43R, 43G, 43B are output with output impedance of 75 to the monitors or any one of various picture processors (none of which is shown in the drawing) through output amplifiers 44R, 44G, 44B. The output signal from the synchronizing signal generator 31 is also output as a SYNC signal with output impedance of 75 through an output amplifier 44S.

The apparatus body 16 is provided with a CCD discriminating circuit 45 which reads the value of the CCD discriminating resistance 24I of the electroscope 13I connected to the body 16 so as to identify the type of CCD 12I mounted in the electroscope 13I, and a CCD driving circuit 46 which generates an optimum driving pulse for the CCD 12I connected thereto on the basis of the input from the CCD discriminating circuit 45.

Figure 3:
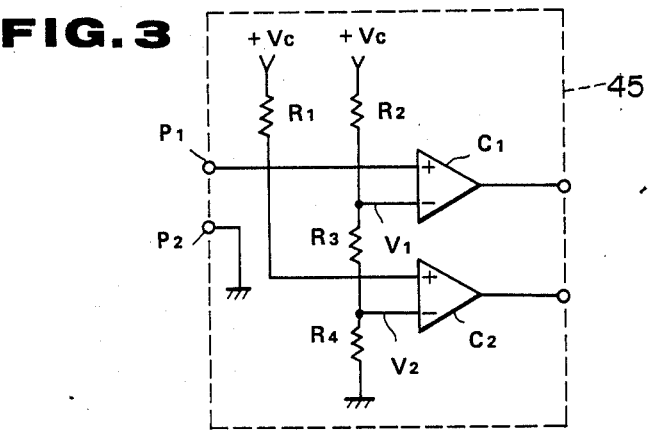

The CCD discriminating circuit 45 is configured as exemplarily shown in FIG. 3.

One of input terminals P1, P2 is connected to a power source terminal $V_c$ through a resistance R1, as well as being connected to non-inversion input terminals of two comparators C1, C2. An inversion input terminal of the comparator C1 is connected to a power source terminal $V_c$ through a resistance R2, as well as being connected to an inversion input terminal of the comparator C2 through a resistance R3. The inversion input terminal of the comparator C2 is earthed through a resistance R4.

When each of the CCD discriminating resistances 24A, 24B, 24C is connected to the input terminal P1 or P2, the resistances R1 to R4 are so set that the relationships between the potentials $V_A$, $V_B$, $V_C$ of the non-inversion terminals of the comparators C1, C2 and the potentials $V_1$, $V_2$ of the inversion terminals thereof are as follows:

$$V_A > V_1, \; V_1 > V_B > V_2, \; V_2 > V_C$$

The use of the output of the comparators $C_1$, $C_2$ enables the discrimination of the CCD discriminating resistances 24I (or the numbers of picture elements of the CCD 12I).

The aforementioned CCD discriminating circuit 45 outputs the discrimination signal to the S/H pulse generating circuit 53 which then outputs an S/H pulse corresponding to the CCD 12I to the S/H circuit 35. The signals output from the CCD discriminating circuit 45 and the synchronizing signal generator 31 are input to a memory controller 54 which then controls the A/D converter 38, the memory 39 and the D/A converter 41 in accordance with the CCD 12I used.

The outline of the apparatus body 16 is described above.

Figures 4A, 4B, 4C:
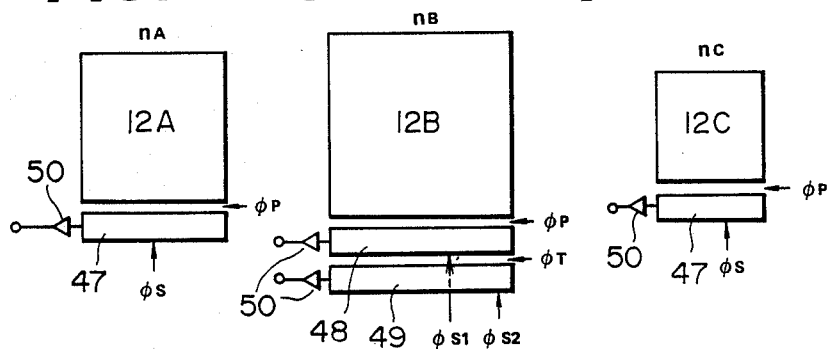
FIGS. 4a-4c are the explanatory view of CCD used in the first embodiment.

FIGS. 4a to 4c show examples of the CCDs 12I which are respectively mounted in the electroscopes 13I, and FIGS. 5a to 5c show examples of the horizontal driving pulse (called a horizontal transfer pulse or a horizontal transfer clock) for each of the CCDs 12I.

As shown in FIG. 4, the CCD 12A and the CCD 12C have different numbers $n_A$, $n_C$ of picture elements ($n_A > n_C$), while the CCD 12B has a different number $n_B$ of picture elements and employs a different driving method. In other words, the CCDs 12A and 12C are each provided with one horizontal transfer register 47 and use as a driving signal a vertical transfer driving pulse p and a horizontal transfer pulse S which are input thereto, while the CCD 12B has a larger number $n_B$ of picture elements, i.e., $n_B$ $n_A$ $n_C$, and is thus provided with two horizontal transfer registers 48, 49 so that an attempt can be made to reduce the time required for reading. The CCD 12B thus requires a vertical transfer driving pulse φp, two kinds of horizontal transfer driving pulses φS1, φS2 and a pulse φT for transfer between the two registers. The signal transferred to the horizontal transfer register 47, 48 or 49 is output by the horizontal transfer pulse φS, φS1 or φS2 through an output amplifier 50.

FIG. 5 shows comparison between the CCDs 12A, 12B and 12C with respect to the horizontal transfer pulse φS which has the most influence on the quality of a formed picture. Differences in the numbers $n_I$ of picture elements of the CCDs 12I represent differences in the times of horizontal scanning. The period of horizontal scanning of the CCD 12B having a larger number of picture elements is shorter than that of the CCD 12A because one horizontal line in the CCD 12B is covered by the two horizontal transfer registers 48, 49. The waveform of the pulse φS, φS1 or φS2 during the period of horizontal scanning is set to the rectangular waveform shown in a circle in FIG. 5 which exhibits a uniform duty ratio and period and no variation in the vibration level. This waveform is common to all the CCDs 12I. However, the time of horizontal scanning depends upon the numbers $n_I$ of picture elements of the CCDs 12I, and the form of the signal during non-horizontal scanning depends upon the type of the CCD 12I used.

In other words, the CCDs 12A and 12C use only one vertical transfer driving pulse φP, while the CCD 12B uses not only the vertical transfer driving pulse φp but also the pulse φT for transfer between the two registers.

Figure 1:
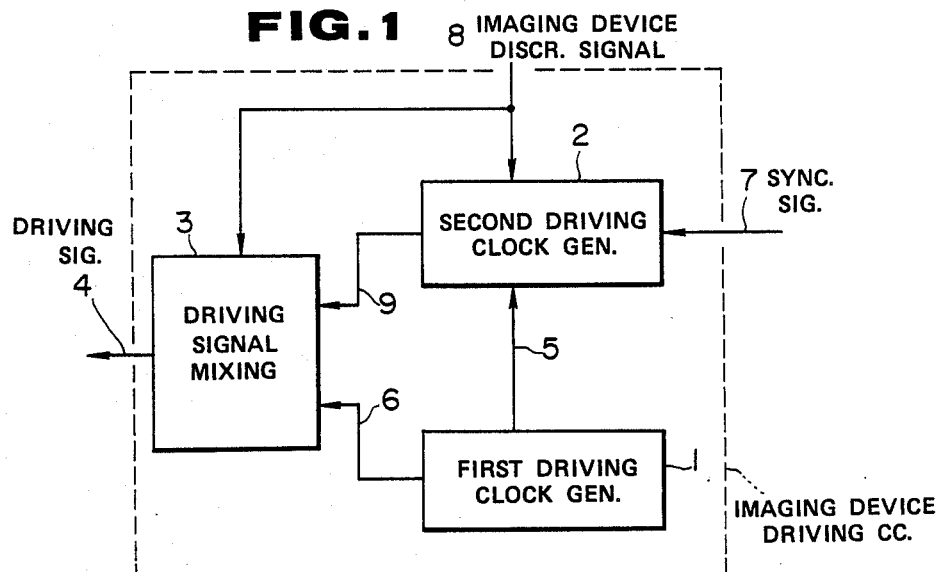

Therefore, the CCD driving circuit 46 of this embodiment is configured as shown in FIG. 1. The CCD driving circuit 46 comprises the first drive clock generating means 1 which generates a rectangular wave having a constant duty ratio and a uniform period regardless of the numbers of picture elements CCDs 12I and the driving methods thereof; the second clock generating means for generating driving clocks having different forms in accordance with the numbers of picture elements $n_I$ of the CCDs 12I or the driving methods thereof; and the mixing means 3 for appropriately mixing the output from the two means in accordance with the numbers $n_I$ of picture elements of CCDs 12I or the driving methods thereof, so that a driving signal optimum to the CCD 12I used is generated and supplied.

Figure 6:
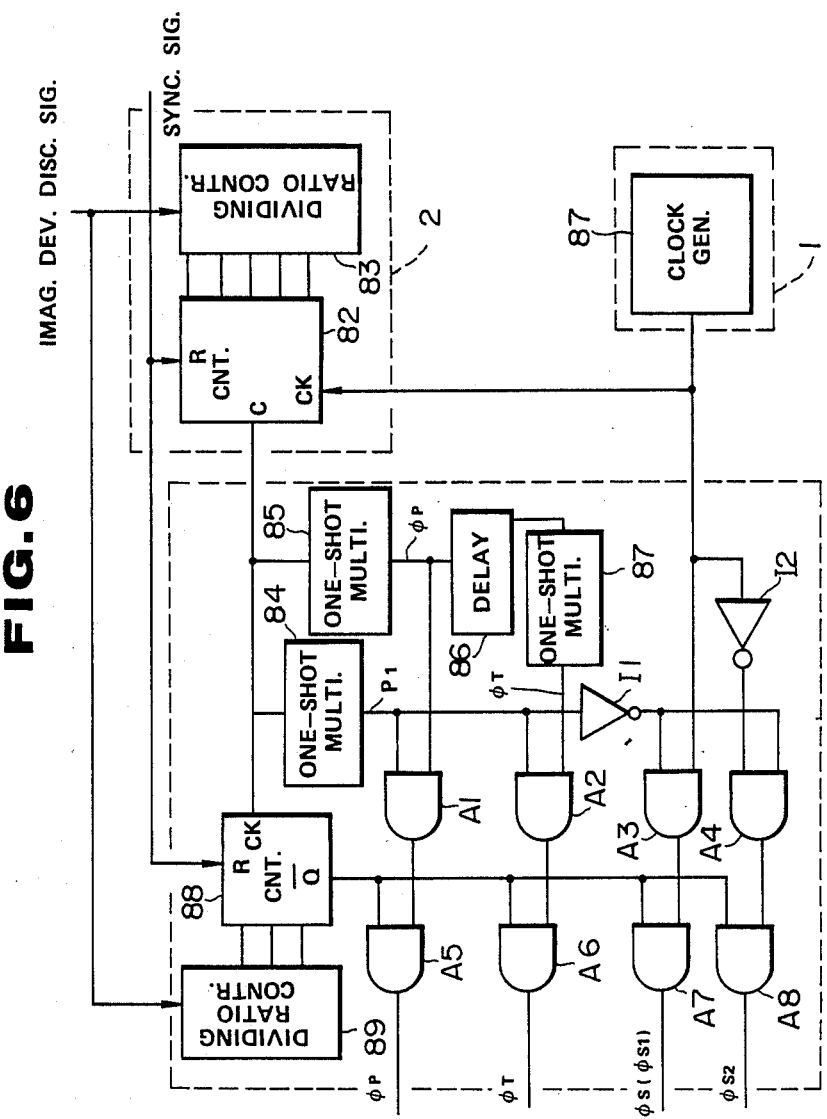

FIG. 6 shows a specific configuration of the CCD driving circuit 46.

The first driving clock generating means 1 is composed of a clock generator 81 using a crystal or the like, and the clock of the generator 81 is input to a counter 82 which forms the second driving clock generating means 2. This counter 82 comprises a decoder, ROM and so on, and the dividing ratio thereof is determined by a dividing ratio controller 83. This dividing ratio controller 83 is controlled by the discriminating signals from the CCD discriminating circuit 46. In other words, the dividing ratio of the counter 82 is set to a value corresponding to the numbers $n_I$ of picture elements of the identified CCD 12I (particularly the number of horizontal picture elements (in the case of $n_A$ or $n_C$) or the bit number of the horizontal transfer registers (in the case of $n_B$)). For example, when the CCD 12I is identified as the CCD 12A or CCD 12C, the dividing ratio is set to a value equal to the number of horizontal picture elements, and when it is identified as the CCD 12B, the dividing ratio is set to a value equal to half of the number of horizontal picture elements.

The counting output for the counter 82 is input to one-shot multivibrators (referred to as "OSM" hereinafter) 84, 85. The OSM 84 outputs a pulse P1 having the width corresponding to the time of non-horizontal scanning shown in FIG. 5. AND gates A1, A2 are opened by this pulse P1 so that a pulse φP of the OSM 85 and a pulse φT of an OSM 87 that is passed through a delay element 86 are each passed therethrough.

The pulse P1 is input to AND gates A3, A4 through an invertor I1 to control the opening and closing of the gates for the clock from the clock generator 81 and the clock that is passed through an invertor I2 and has a phase 180° shifted. In other words, the pulse P1 is inverted during the periods of non-horizontal scanning and the and gates A3, A4 are thus closed so that no clock is passed therethrough. During the periods of horizontal scanning, the pulse φS (or φS1 and φS2 are output through the AND gates A3, A4.

The output from the counter 82 is input to a counter 88 which outputs a signal "L" when the number of pulses output from the counter 82 reaches a given value. The dividing ratio of the counter 88 is determined by a dividing ratio controller 89 which outputs a dividing ratio setting signal in accordance with the CCD discriminating signal.

This dividing ratio is set to a value equivalent to the number of vertical picture elements of the CCD 12I used. Thus, when the number of pulses output from the counter 82 reaches the number of vertical picture elements, four AND gates A5, A6, A7 and A8 are closed.

To each of the counters 82, 88, is added a synchronizing signal (timing signal) which resets or makes counting inable at each time the rotary filter 27 is brought in the shield times.

The driving circuit shown in FIG. 6 causes the driving signals φP, φT (φS1) and φS2 shown in FIG. 5 to be output in accordance with the CCD 12I used. These driving signals are respectively output during the shield periods and the stored signal charges are read out during the exposure periods.

In the case of the CCD 12B, the S/H pulse generating circuit 53 in the signal processing unit 15 outputs the S/H pulse with a frequency double that in the CCD 12A or the CCD 12C. Accordingly, the conversion rate of the A/D converter 38 is set to a value with a double frequency, and the write clock in the memory 39 is also set to a value with a double frequency. According to this, the cut-off frequency of the LPF 36 may be changed.

This first embodiment comprises the first driving clock generating means 1 which outputs the common driving clock signal with a given frequency, and the second driving clock generating means 2 which generates different clock signals in accordance with the numbers $n_I$ of picture elements of the CCDs 12I and the driving methods thereof, and generates the driving signal by mixing the driving clocks of the two driving clock generating means 1, 2 corresponding to the CCD 12I used, whereby the generation of the driving signal can be realized by a simple arrangement even if the number $n_I$ of picture elements is changed.

FIG. 7 shows a configuration of a CCD driving circuit 61 of a second embodiment of the present invention.

In this embodiment, the first driving clock generating means 1 comprises an n-dividing circuit 62 (n denotes an integer) and a filter means 63. The clock of 8 f sc (f sc = 3.58 MHz) which is used in a video signal processing system (not shown in the drawing) is divided into n portions by the dividing circuit 62, then formed into a rectangular wave having a uniform duty ratio and period and having no variation in the vibration level by removing by a filter means 63 the components with frequencies other than the basic frequency of the horizontal driving pulses during the horizontal scanning times and the higher harmonic components thereof, and input to the driving signal mixing means 3. This filter means 63 can be realized by using, for example, a comb line filter. The second driving clock generating means 2 comprises a reset circuit 64 which generates a reset pulse with a short pulse width synchronously with the horizontal synchronizing signal, a counter which is reset by the rest pulse of the reset circuit 64 and which counts (8/n) f sc input from the first driving clock generating means 1, and ROM (this embodiment uses ROM with a register and data is output synchronously with (8/n) f sc) which is accessed by using as address input the output from the counter 65 and the CCD discriminating signal. The second driving clock generating means 2 thus generates different driving clocks 67a, 67b, 67c, 67d in accordance with the type of the CCD 12I used (the number of picture elements or the driving method) and control signals 68a, 68b, 68c, 68d for the driving signal mixing means 3 in the subsequent stage.

The driving signal mixing means 3 uses the control signals 68b, 68c, 68d input from the second driving clock generating means 2 to gate horizontal driving pulses 73a, 73b which are input to gate circuits 69, 71 and 72 from the first driving clock generating means 1 and mixes the different driving pulses 67c, 67d which are input from the second driving clock generating means 2 and which are produced in accordance with the type of the CCD 12I used to output pulses φS/φS1, φS2, as well as outputting pulses φp and φT from the driving pulse 67a which was produced by the second means 2 and the driving pulse 67b passed through a gate circuit 76.

The driving pulse 67a is output through a buffer 74, and the output from the gate circuit 69 is also output through a buffer 75.

FIG. 8 shows examples of the output from the CCD driving circuit 61 shown in FIG. 7.

When the signal 73 shown in FIG. 8a is input to the gate circuit 69 by the first driving clock generating means 1, for example, in the case of the CCD 12A, the gate signal 69b of the gate circuit 69 is the signal shown in FIG. 8b and, in the case of the CCD 12B, the gate signal 68b is the signal shown in FIG. 8c.

During the periods in which the gate circuit 69 is closed by the above-described gate signal 68b, the second driving clock generating means 2 outputs the signal 67c shown in FIG. 8d or 8e in accordance with the CCD 1A or CCD 12B. The signal φS passed through the gate circuit 69 is thus the signal shown in FIG. 8f or 8g in accordance with the CCD 12A or CCD 12B.

The functional effect of this embodiment is the same as that of the first embodiment.

In the second embodiment, the ROM 66 can be replaced by PLD or the like, and, if the second clock generating means 2 is composed of a gate array, the same effect is exhibited.

Figure 9:
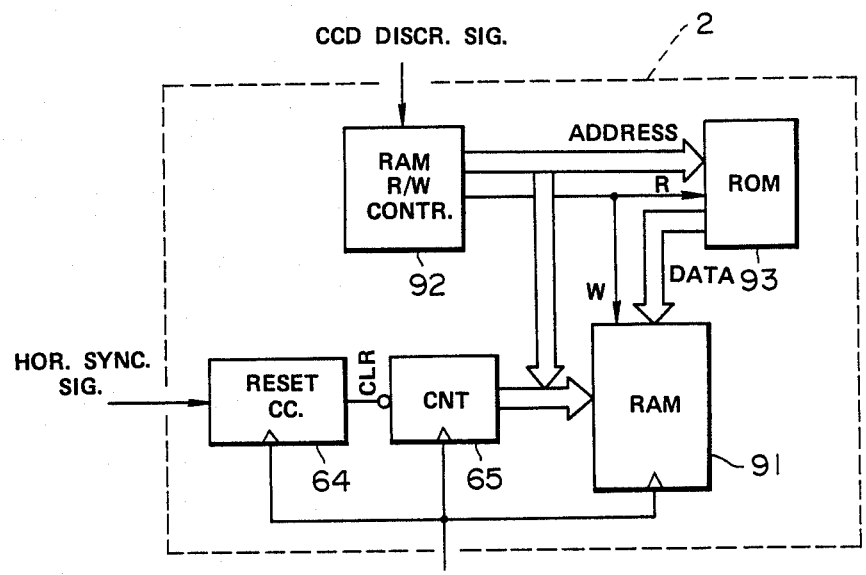
FIG. 9 is a block diagram of a second clock generating means of a third embodiment of the present invention.

FIG. 9 shows a configuration of the second clock generating means in a third embodiment of the present invention.

The second driving clock generating means 2 in this embodiment is provided with an RAM 91 in place of the ROM 66 for generating the vertical driving signals shown in FIG. 7. The CCD discriminating signal is input to a n RAM read/write controller 92 so that timing data is transferred to the RAM 91 from the ROM 93 in which the timing data corresponding to the numbers of picture elements was previously stored in accordance with this discriminating signal.

Figure 10:
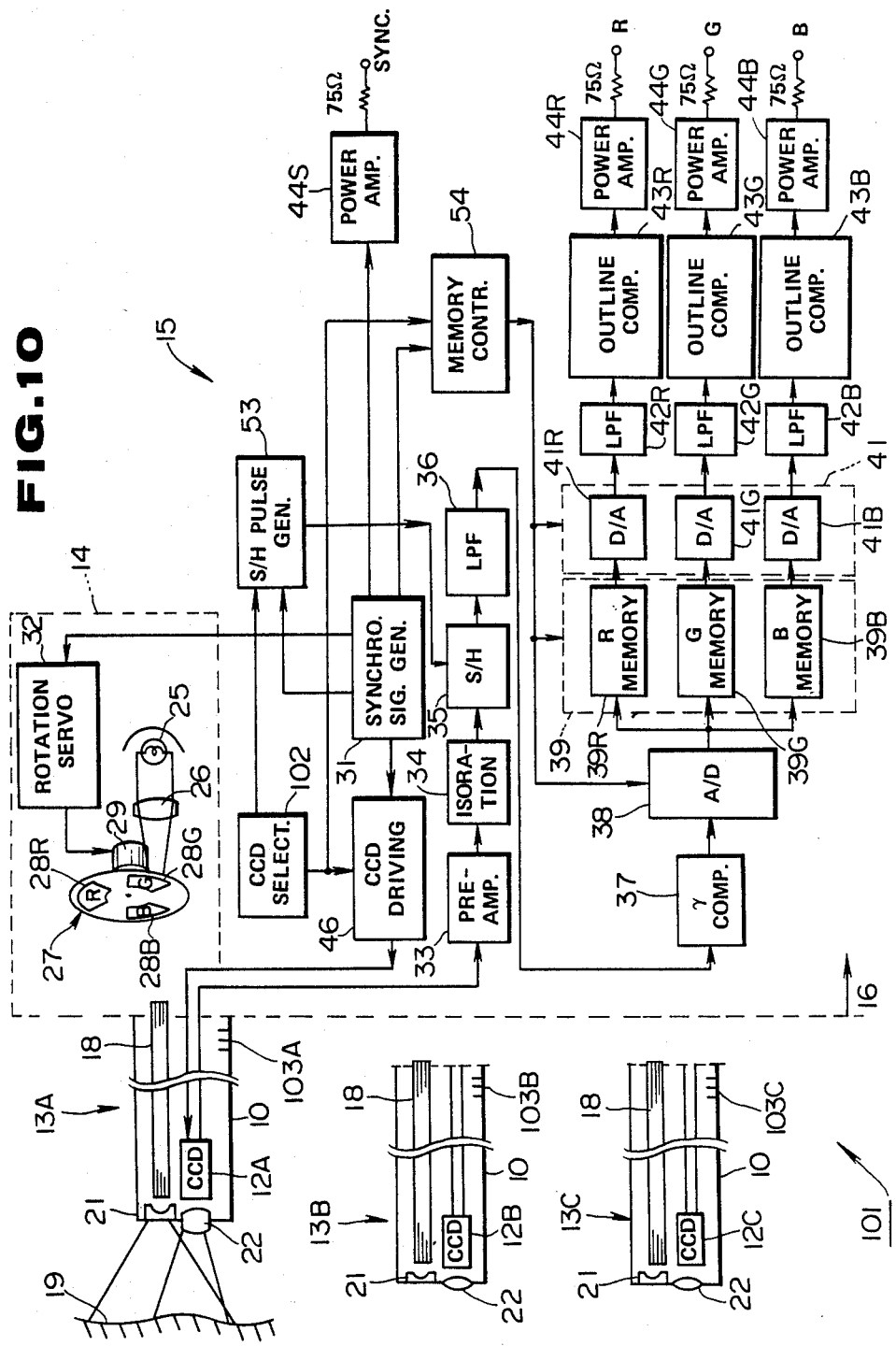
FIG. 10 is a block diagram of an electronic endoscope apparatus of a fourth embodiment of the present invention.

FIG. 10 shows an electronic endoscope apparatus of a fourth embodiment of the present invention.

In an apparatus 101, the switching in the CCD driving circuit 46 which is automatically performed by the CCD discriminating signal in the apparatus shown in FIG. 7 is manually performed by a CCD selecting circuit 102. This embodiment thus has no resistance 24I which is provided in each of the electroscopes 13I and which has different values corresponding to the numbers of picture elements of the CCDs 12I and the types thereof. Alternatively, this embodiment can use marks 103I such as color codes or bar codes which indicate the numbers of picture elements of the CCDs 12I and whether each of the CCDs 12I has a single horizontal register or a plurality of horizontal registers so that manual switching is performed by discriminating the marks 103I. Other constituents are the same as those in the first embodiment.

Figure 11:
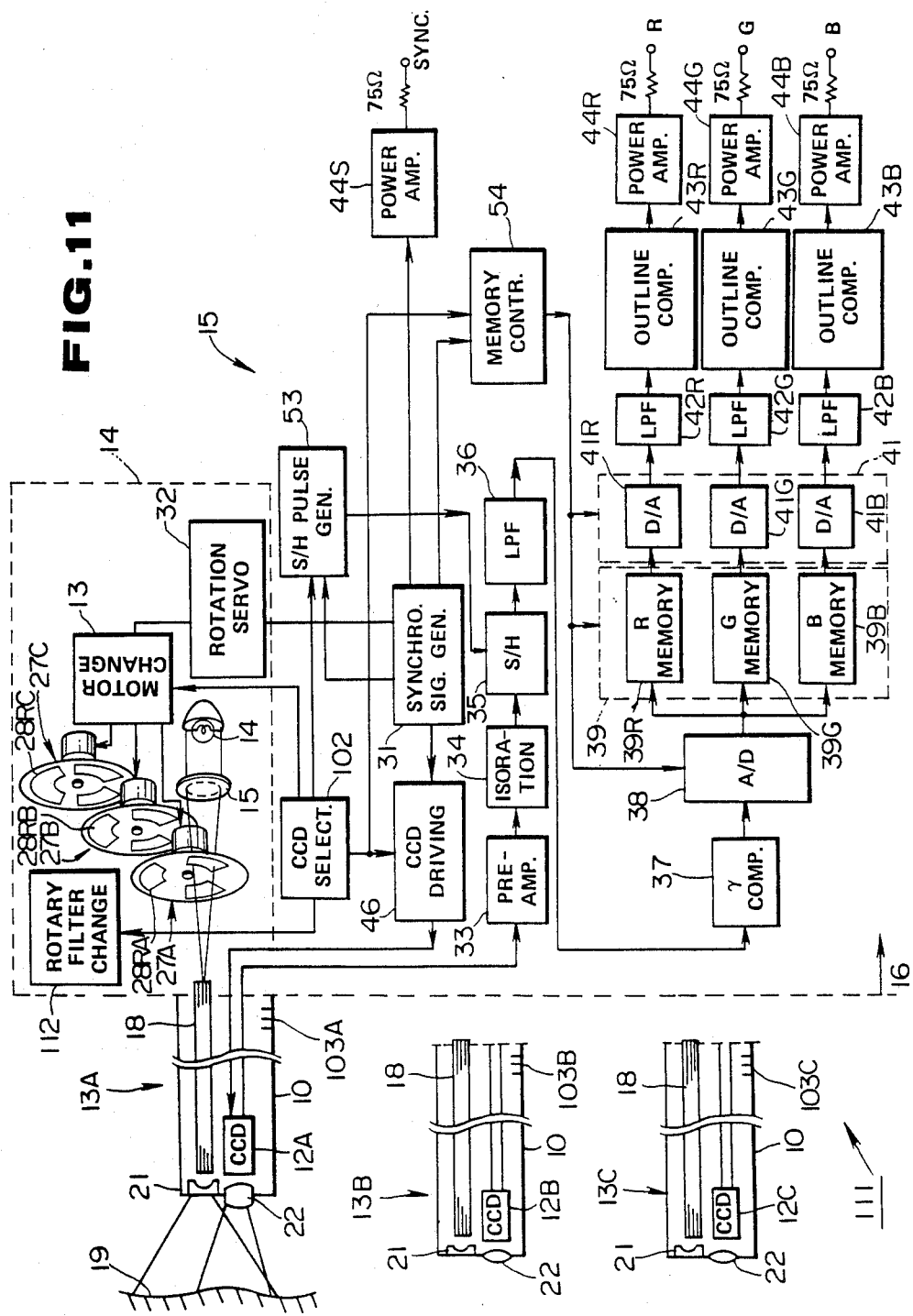
FIG. 11 is a block diagram of an electronic endoscope apparatus of a fifth embodiment of the present invention.

FIG. 11 shows an electronic endoscope apparatus of a fifth embodiment of the present invention.

In this embodiment, rotary filters 27A, 27B, 27C are switched by the CCD selecting circuit 102 of the apparatus 101 shown in FIG. 10 in accordance with the electroscopes 13I (i.e., the CCDs 12I).

In these three rotary filters 27I, the lengths of color filters 28JI (J=R, G, B), i.e., the times of charge storage (exposure times), are changed in accordance with the numbers of picture elements of the CCDs 12I and the read modes thereof. Namely, the shield time or the signal read time is changed in accordance with the CCDs 12I. For example, when the CCD 12I used (CCD 12A in FIG. 4) has the longest time for reading signals, the rotary filter 27A having the longest shield time (having the shortest color filter 28JA) is mounted on the light path (FIG. 11 shows 28RA, 28RB, 28RC alone as the color filters 28JI). One of the rotary filters 27I is mounted on the light path by a mechanism having the form of a belt conveyer. This mechanism is described in Japanese patent application No. 266061/1986 and is shown as a rotary filter changing circuit 112 in FIG. 11. A motor 29I for each of the rotary filters 27I is selected through a motor changing circuit 113 and then driven to rotate it.

Other constituents are the same as those of the fourth embodiment.

This embodiment enables the shield time to accord with the time required for reading the stored charges from the CCDs 12I in accordance with the numbers of picture elements of the CCDs 12I and the reading form (generally the structure thereof). It is therefore possible to set the exposure time to the maximum value possible for the CCD 12I used and thus to increase the S/N ratio of the signal obtained.

This embodiment is effectively applied to the CCDs 12I having a form of line transfer in which a light receiving portion is also used as a transfer portion.

Figure 12:
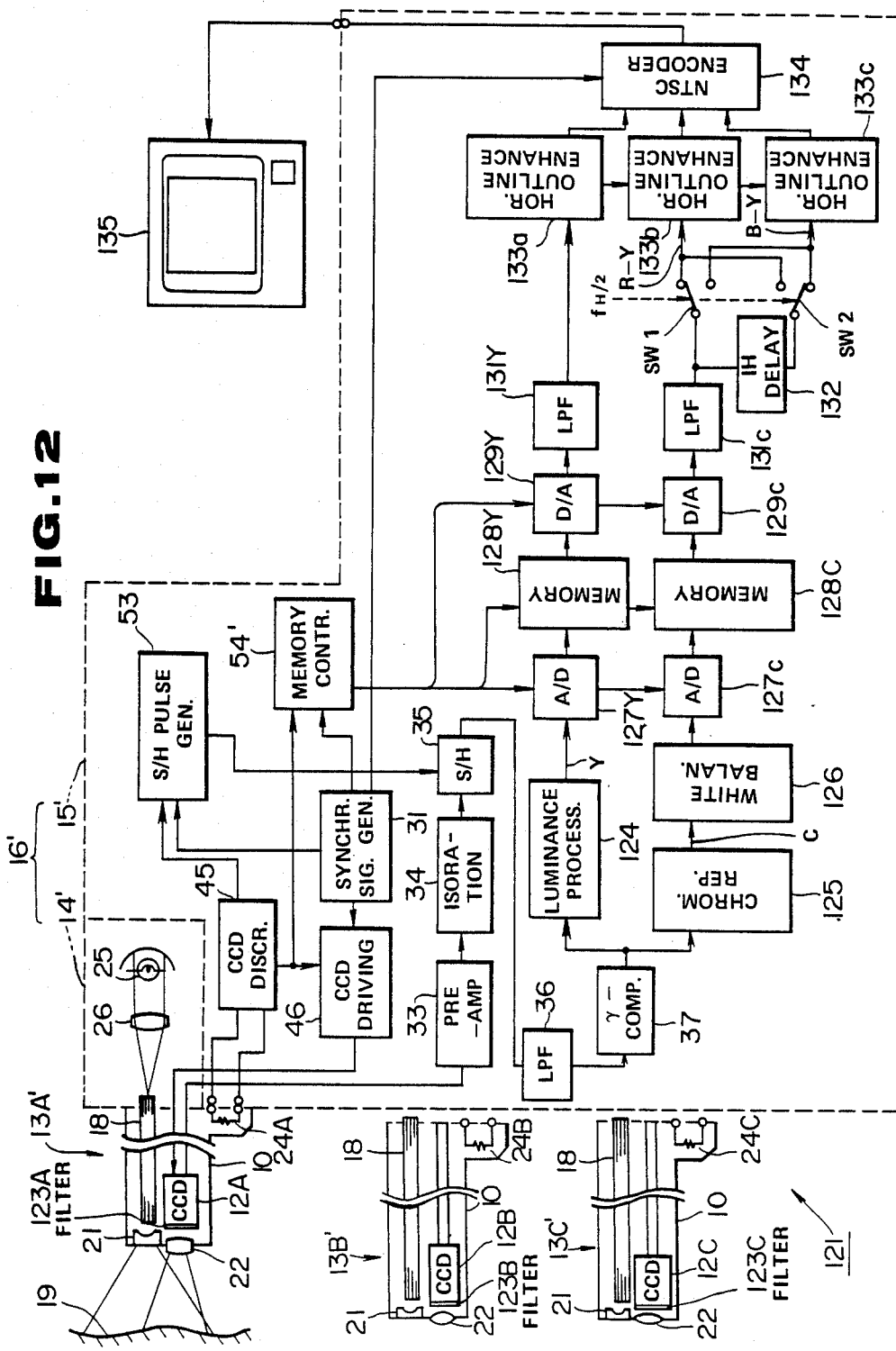
FIG. 12 is a block diagram of an electronic endoscope apparatus of a sixth embodiment of the present invention.

FIG. 12 shows an electronic endoscope apparatus 121 of a sixth embodiment of the present invention.

This embodiment use electroscopes 13I' (synchronous) each containing a mosaic filter, and an apparatus body 16' is provided with a light source unit 14' for outputting white light in accordance with the electroscopes and a synchronous signal processing unit 15'.

In this light source unit 14', the white light from a white lamp 25 is condensed by a condenser lens 26 and then applied to the incidence surface at one end of a light guide 18. The subject 19 is illuminated by the white illuminating light which is projected from the projection surface at the other end of the light guide 18. An image of the subject 19 illuminated is formed in each of the CCDs 12I by means of each of the objective lenses 22. A mosaic filters 123I are respectively provided in front of receiving portions of the CCDs 12I so as to separate the colors of the picture elements from each other.

The driving signal is applied to each of the CCDs 12I from the CCD driving circuit 46. The signal read from each of the CCDs 12I by application of the driving signal is input to a luminance signal processing circuit 124 and a chrominance regenerating circuit 125 through a pre-amplifier 33, an isolation circuit 34, an S/H circuit 35, an LPF 36 and a γ-compensating circuit 37.

The luminance signal processing circuit 124 produces a luminance signal Y. The chrominance regenerating circuit 125 produces line sequential color difference signals R-Y, B-Y (represented by C) which are then subjected to white balance by a white balance circuit 126 and stored in a memory 128C through an A/D converter 127C. The luminance signal Y is also converted into digital signals through an A/D converter 127Y and then stored in a memory 128Y.

The picture date for one frame or one field which are stored in the memories 128Y, 128C are simultaneously read and converted into analogue signals by D/A converters 129Y, 129C, respectively, and then unnecessary harmonics are cut off and removed by LPFs 131Y, 131C. The line sequential chrominance C which is passed through the LPF 131C is input to a first analogue switch SW1, as well as being input to a second analogue switch SW2 through a 1H delay element 132. These first and second analogue switches SW1 and SW2 are switched in each 1H by a signal $f_{H/2}$ with a period equivalent to double the 1H (the time of one horizontal scanning) and a frequency equivalent to half 1H while interlocking with each other to produce synchronized color difference signals R-Y and B-Y from the line sequential chrominance C. After the horizontal outlines of the luminance signal Y and the color difference signals R-Y, B-Y have been respectively enhanced in horizontal outline enhancing circuit 133a, 133b, 133c, these signals are input to an NTSC encoder 134 and then mixed with the horizontal and vertical synchronizing signals from the synchronizing signal generating circuit 31 to produce a composite picture signal of an NTSC mode which is then displayed on a color monitor 135.

The number of picture elements of the CCD 12I of the electroscope 13I' connected to the apparatus body 16' and the mode used are discriminated by the CCD discriminating circuit 45. The use of the discriminating signal from the CCD discriminating circuit 45 causes the driving circuit 46 to output the driving signal corresponding to the CCD 12I used. This driving signal is output synchronously with the synchronizing signal from the synchronizing signal generating circuit 31. This synchronizing signal is input to the S/H pulse generator 53 together with the discriminating signal to cause the pulse generator 53 to output a sample-holding pulse to the S/H circuit 35 in accordance with the CCD 12I used.

The synchronizing signal is also input to a memory controller 54' together with the discriminating signal to cause the the controller 54' to control changing of the A/D changing rates of the A/D converters 127Y, 127C, the write/read control of the memories 128Y, 128C and the D/A changing rates of the D/A converters 129Y, 129C in accordance with the CCDs 12I.

The discriminating signal may be employed for changing the cut-off frequencies of the LPFs 131Y, 131C and the enhancement frequencies of the outline enhancing circuits 133a, 133b, 133c. The changing of the cut-off frequencies and the enhancement frequencies is described in Japanese patent application No. 17982/1987 (U.S. patent application Ser. No. 134,627).

Figure 13:
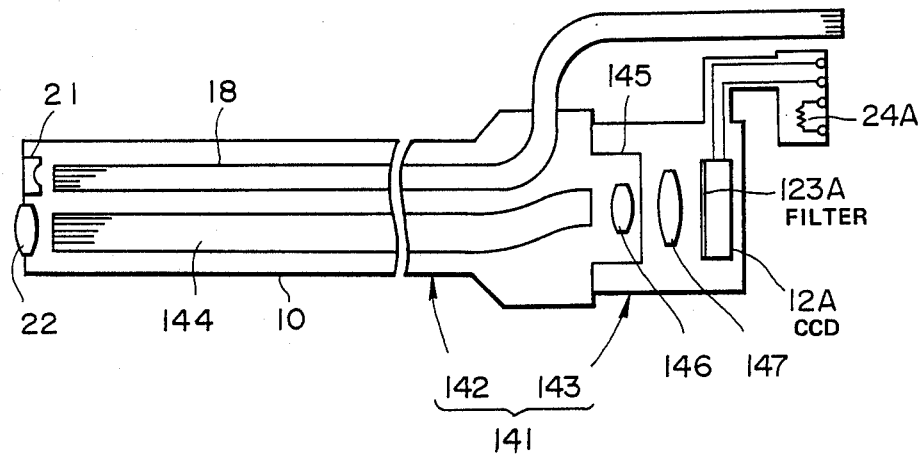
FIG. 13 is a block diagram of a scope with an outer television camera which can be used in the electronic endoscope apparatus shown in FIG. 12.

FIG. 13 shows a scope 141 with an outer television which, for example, which can be used in the sixth embodiment shown in FIG. 12. This scope 141 comprises a fiberscope 142 and a television camera 143. The fiberscope 142 contains, for example, an image guide 144 in place of the CCD 12A and the mosaic filter 123 in the electroscope 13A'. The incidence surface at one end of the image guide 144 is disposed in the focusing surface of an objective lens 22, and an optical image formed on the incidence surface is transmitted to the projection surface of the other end thereof adjacent to an ocular portion 145. An ocular 146 is disposed opposite to the projection surface so that the optical image transmitted can be observed through an ocular window. The television camera 143 is provided in the ocular portion 145 so that an image can be formed in the CCD 1A through an image-forming lens 147. The mosaic filter 123 A is mounted in the light receiving portion of the CCD 12A so as to separate the colors of picture elements from each other.

The scope 141 has the same function as that of the electroscope 13A' and can be used in place of the electroscope 13A' by being connected to the apparatus body 16' shown in FIG. 12. Although FIG. 13 shows a synchronous color imaging means which is equipped with the CCD 12A having the mosaic filter 123A provided in the ocular portion 145 of the fiberscope 142, it is apparent that an imaging means equipped with the CCD 12A having no mosaic filter 123A can be used in place of the electroscope 13A of the first embodiment.

Figure 14:
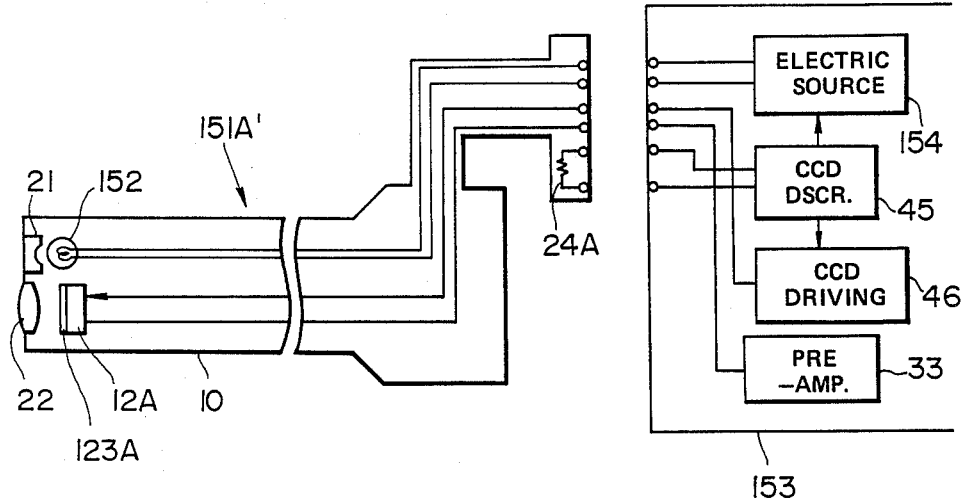
FIG. 14 is a block diagram of an electroscope containing a lamp at the end of an insertion portion thereof.

The aforementioned embodiments respectively concern the electroscopes 13I, 13I' each provided with the light guide 18 and the fiberscope 142. For example, as shown in FIG. 14, a lamp 152 may be contained in an insertion portion at the end of an electroscope 151A'. This electroscope 151A' can be used in place of the electroscope 13A' shown in FIG. 12. In this case, the lamp 152 is connected to a power source unit 154 in an apparatus body 153 through a cable. The amount of the light emitted from lamp 152 may be controlled by the power source unit 154 on the basis of the discriminating signal obtained by discrimination of the number of picture elements of the CCD 12A (generally 12I) and the type thereof. Such a control can remove the problem that the S/N ratio varies when the illuminating time (time required for storing charges) must be changed because the time required for reading charges is changed.

The apparatus body 153 has the same configuration as that of the apparatus body 16' shown in FIG. 12 with the exception that the power source unit 154 is further provided.

It is apparent that LEDs which respectively emit red, green and blue colors of light can be used in place of the lamp 152. Successive lighting-up of the LEDs enables surface sequential illumination in which the CCDs 12I having no mosaic filter 123 I can be used.

FIG. 15 shows timing charts which assist to explain the operation of a modified example of the first embodiment of the present invention.

In the first embodiment, each of the horizontal transfer registers 48, 49 of the CCD 12B serves to transfer the signals of half the horizontal picture elements of a number (represented by $n_{BH}$), but two registers which each serve to transfer signals of the horizontal picture elements of the number $n_{BH}$ may be used. The CCD in this case is denoted by 12B', and the timing charts in this case are shown in FIG. 15. In the CCD 12B', although the horizontal scanning time of each of the registers is the longest, the total horizontal scanning time is shorter than that of the CCD 12A because it uses the two registers (with the proviso that the number of picture elements $n_B$ of the CCD 12B' and the number of picture elements $n_A$ of the CCD 12A satisfy the relationship $2n_A > n_B > n_A$).

Figure 16:
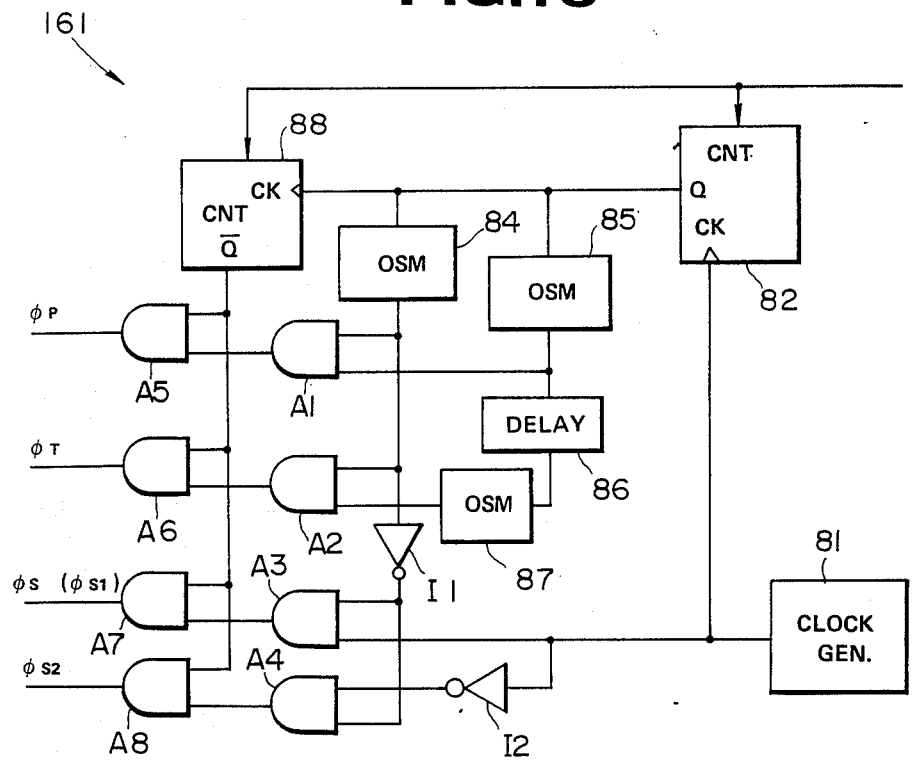
FIG. 16 is a block diagram of a drive circuit of a seventh embodiment of the present invention.

FIG. 16 shows a CCD driving circuit 161 in a seventh embodiment of the present invention.

This driving circuit 161 is so configured as to generate a row of horizontal transfer clocks of a number required for driving the CCD 12I which has the maximum number of bits in the horizontal transfer register (the bit number of the horizontal register 47 of the CCD 12A shown in FIG. 4 which is equivalent to the number of horizontal picture elements of the CCD 12A) in the driving circuit shown in FIG. 6, as well as generating a vertical transfer clock of a number that is equal to the maximum number of the vertical picture elements of the CCD 12I (the CCD 12B shown in FIG. 4).

In other words, the driving circuit 161 is so configured as to generate a row of horizontal transfer clocks of and the vertical transfer clock whose numbers enable the reading of all the picture elements of the CCDs 12I which have different numbers of picture elements and employ different reading modes. Therefore, such a configuration of the CCD driving circuit 161 need not use the CCD discriminating signal (the clock number may be set to a value greater than the value required for reading the maximum number of picture elements).

This driving circuit 161 uses none of the dividing ratio control circuits 83, 89 used in the circuit shown in FIG. 6 is used, and the dividing ratio of each of the counters 82, 88 being set to a fixed value.

When the driving circuit 161 is applied to the apparatus 11 of the first embodiment, only the synchronizing signal is input to the driving circuit 161 from the synchronizing signal generator 31.

Figure 17:
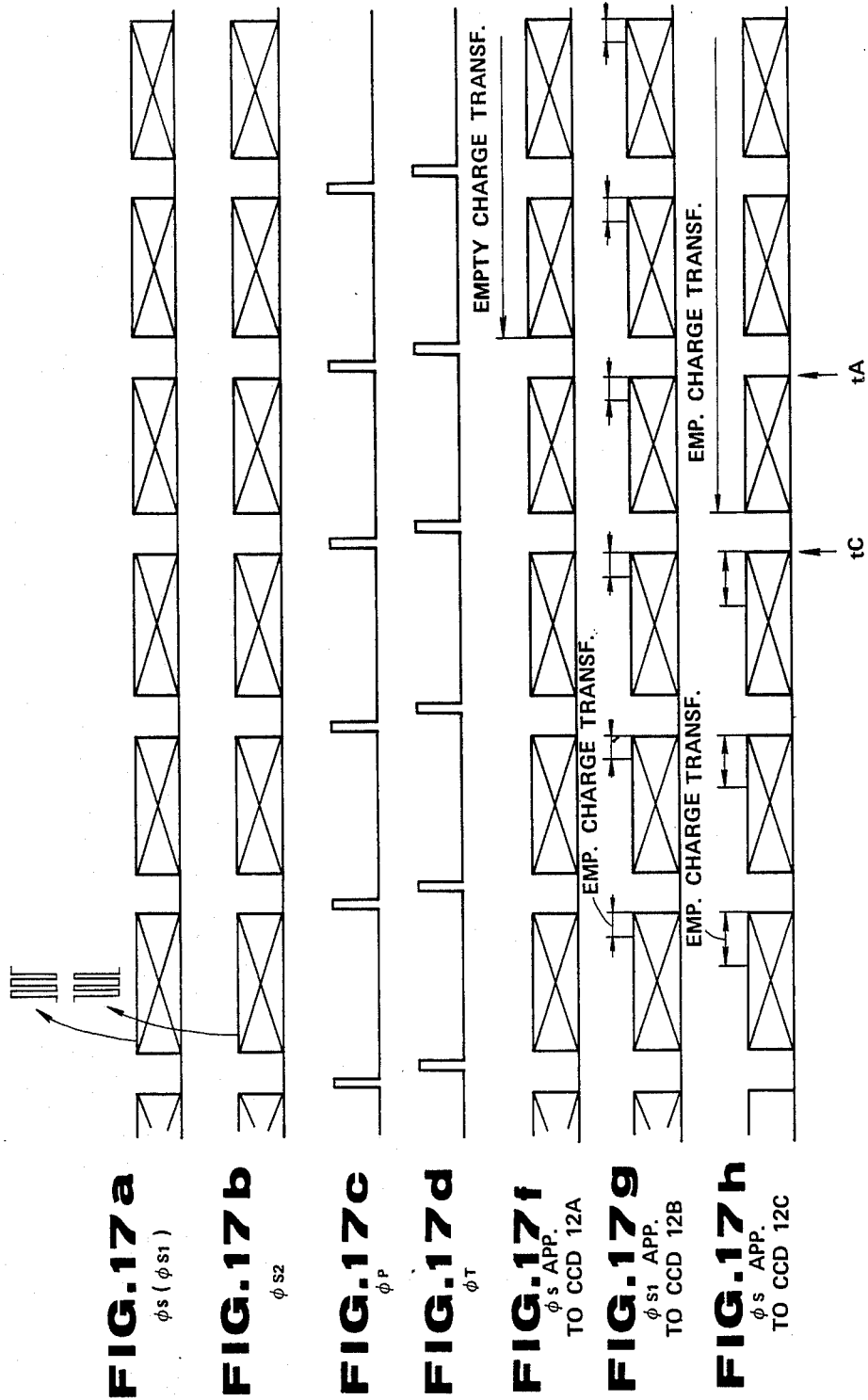
FIGS. 17a-17d and 17f-17h show timing charts which assist to explain the operation of the seventh embodiment.

FIG. 17 shows signals applied to the electroscopes 13I from the driving circuit 161.

FIGS. 17a, 17b, 17c, 17d show the driving signals $\phi_S$ ($\phi_{S1}$), $\phi_{S2}$, $\phi_p$, $\phi_T$ which are output from the driving circuit 161, and FIG. 17f shows the signal $\phi_S$ applied to the CCD 12A. In this case, the clock number is equal to the number $n_{AH}$ of horizontal picture elements of the CCD 12A, and thus horizontal transfer is effected by the signal $\phi_S$ having this clock number. However, this signal is used for empty charge transfer after the passage of a time (denoted by $t_A$) the clock number becomes over the number of vertical picture elements $n_{AV}$.

On the other hand, in the case of the CCD 12B, as shown in FIG. 17g, empty charge transfer is performed in the clock portion in each of the clock rows which has clocks of a number over the bit number of each of the horizontal transfer registers 48, 49.

In the case of the CCD 12C, as shown in FIG. 17h, empty charge transfer is performed in the portion of each of the clock rows which has clocks of a number over the number of horizontal picture elements $n_{CH}$, and after the passage of a time (denoted by $t_C$) the clock number becomes over the number of vertical picture elements $n_{CV}$.

The clocks $\phi_S$ and $\phi_{S2}$ respectively shown in FIGS. 17a and 17b are clocks having the periods half shifted from each other.

The use of the driving circuit 161 can simplify the configuration of the apparatus even if the CCDs 12I have different numbers of picture elements and use different reading modes. In such a case, the use of a interline transfer method in which light receiving portions and transfer portions are alternately arranged has no disadvantage even if the reading time is not optimized (reading may be completed before the next reading time). In each of the CCDs 12I of this interline transfer method, the charges in the light receiving portion are transferred to each of the vertical registers constituting the transfer portion by a transfer signal (not shown) during each shield time.

Figures 18, 20A, 20B, 20C:
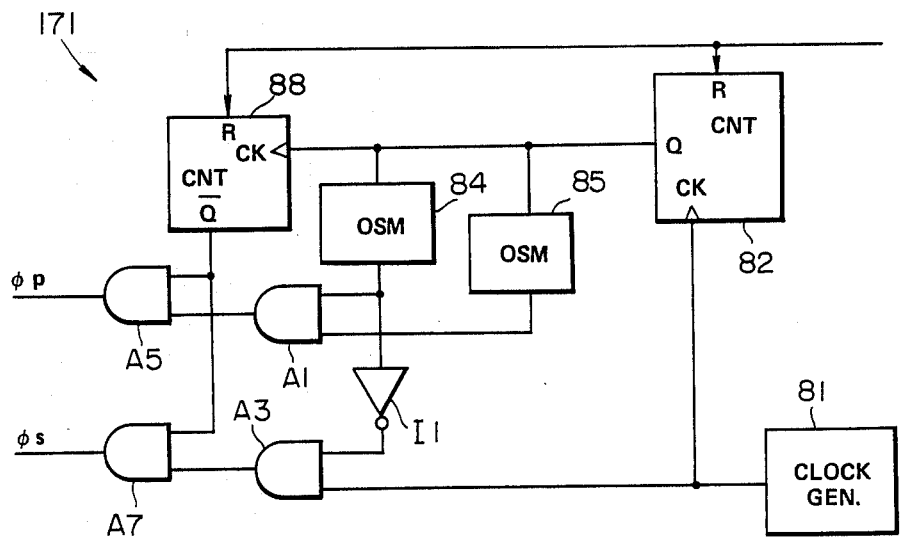
FIG. 18 is a block diagram of a drive circuit of an eighth embodiment of the present invention.
FIG. 20a-20c are the explanatory views of picture signals in the eighth embodiment.

When the CCD 12B shown in FIG. 4b having a plurality of the horizontal transfer registers 48, 49 is not used, but a CCD having a signal register (denoted by 47 in FIG. 4) is used (if the CCDs have different numbers of picture elements), a driving circuit 171 shown in FIG. 18 can be used in place of the driving circuit 161 shown in FIG. 16. This driving circuit 171 has a configuration in which the portions for generating the signals $\phi_{S2}$ and $\phi_T$ shown in FIG. 16 are removed.

When a CCD 12K (K=A or C) having a single horizontal transfer register 47 in the same way as the CCD 12A or 12C is used, an electronic endoscope apparatus 181 having the configuration shown in FIG. 19 can be realized.

In this apparatus 181, each of electroscopes 13K has no information source (i.e., the resistance 24K) with respect to the number of picture elements, and a signal processing unit 183 constituting an apparatus body 182 has no CCD discriminating circuit. Thus, the S/H pulse generating circuit 53 and the memory control circuit 54 perform signal processing using the same characteristics regardless of the numbers of picture elements of the CCDs 12K. Consequently, the signal processing unit 183 (or the apparatus 181) performs signal processing using the same characteristics regardless of the numbers of picture elements of the CCDs 12K and causes a color monitor 184 to display the color picture picked up.

For example, R signals output from the signal processing unit 183 in the cases of the CCDs 12A and 12C show the signal time $T_A$ and the shorter signal time $T_C$ shown in FIGS. 20b and 20c, respectively. Therefore, the display regions of the color monitor in the cases of the CCDs 12A and 12C are respectively shown by the solid lines and the dotted lines in FIG. 19.

The memory 39 used in the apparatus has a memory capacity which can receive the maximum number of picture elements (in this case, the CCD 12A). When the CCD 12A is used, empty signals are written in the memory 39 after all the picture elements of the CCD 12C have been completely written, and the signal time required for reading memory elements in one line in the horizontal direction of the memory 39 is set to substantially 1 H or less. Therefore, if the number of picture elements written in the memory 39 is as small as the CCD 12C, the display screen becomes also small.

Since the apparatus 181 uses the horizontal transfer clock with a given frequency and the vertical transfer clock with a given frequency (a given period) regardless of the numbers of picture elements of the CCDs 12K, it is possible to simplify the configuration of the driving circuit 171. In addition, since the characteristics of signal processing in the signal processing unit 183 are fixed regardless of the numbers of picture elements, the configuration of the signal processing system can also be simplified.

Although this embodiment concerns the CCDs 12A, 12C, CCDs having other numbers of picture elements (each having a single horizontal transfer register) can also be used in the apparatus.

Although above description concerns the application of the driving circuit 171 shown in FIG. 18 to the surface sequential method of apparatus, it is apparent that CCD equipped with a color mosaic filter can also be applied to this apparatus.

The signal processing unit 183 shown in FIG. 19 is so set that the characteristics of signal processing are the same even if the numbers of picture elements of the CCDs 12K are different. However, the frequency of the reading clock is changed in accordance with the numbers of picture elements when a signal is read from the memory 39 so that the signal can be displayed the same display area in the display screen of the monitor 184 regardless of changes in the numbers of picture elements. In other words, when the number of picture element is small, the frequency of the reading clock is lowered so that the display area can be increased and becomes the same as that with the CCD having a larger number of picture elements. In this case, since the signal band, particularly the upper limit of the signal band, depends upon the numbers of picture elements, it is desirable to change the cut-off frequencies of the LPFs (denoted by 42R, 42G, 42B in FIG. 19) in the stage subsequent to the memory 39. The frequencies of the outline compensating circuits 43R may also be changed. When the frequency of the clock for reading from the memory 39 is changed, it is desirable to change the conversion rate of the D/A converter or the like to conform with the change.

Figure 21:
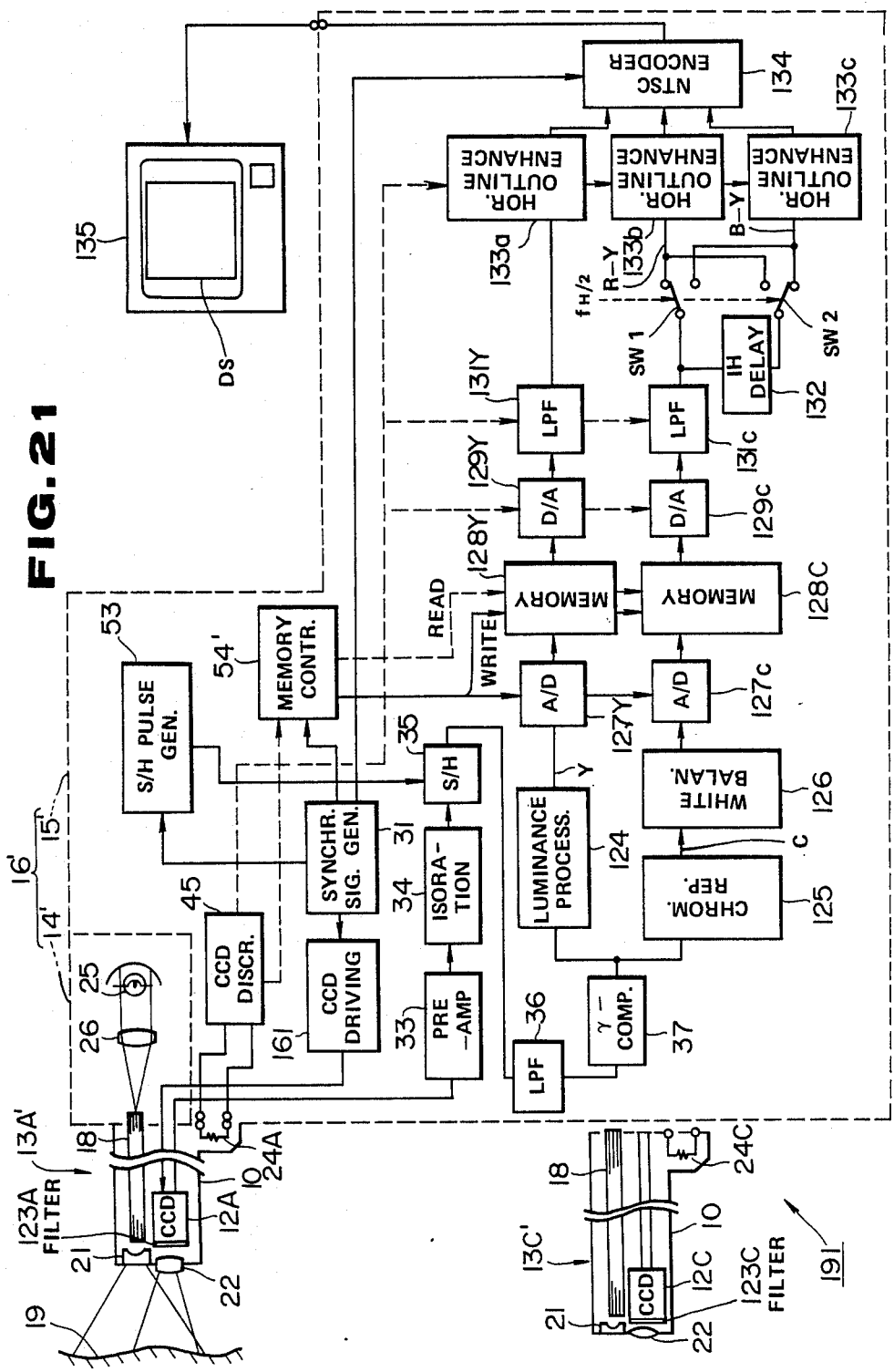
FIG. 21 is a block diagram of an electronic endoscope apparatus of a ninth embodiment of the present invention.

FIG. 21 shows an electronic endoscope apparatus 191 in which the characteristics of the units behind the unit for reading from the memory means are changed in accordance with the numbers of picture elements, as described above.

FIGS. 21 shows an example of a mosaic type of apparatus. The characteristics are fixed until writing in the memories 128Y, 128C starts regardless of the numbers of picture elements. However, the read clock is set by the memory controller 54' in which the discriminating signal is input from the CCD discriminating circuit 45 in accordance with the numbers of picture elements. The D/A conversion rate, the cut-off frequencies and the enhancement frequencies of the D/A converters 129Y, 129C, the LPF 131Y, 131C and the horizontal outline enhancing circuit 133a, 133b, 133c, are respectively changed in accordance with the discrimination signals so as to be automatically changed and set so as to have the characteristics suitable for the signal bands read from the memories 128Y, 128C.

This embodiment enables an image of the subject to be displayed in the same display area DS of the monitor 135 regardless of the numbers of picture elements of the CCDs 12K.

The characteristics may be manually changed without the need of using the CCD discriminating circuit 45.

In addition, other embodiments can also be configured by combining parts of the above-described embodiments.

What is claimed is:

1. An endoscope apparatus comprising:
   first and second endoscope means having long, thin first and second insertion portions, first and second projection means each projecting illuminating light from one end of each of said insertion portions, first and second objective optical systems respectively provided at said ends of said first and second insertion portions to form an optical image of an object and first and second solid state imaging devices for respectively performing photoelectric conversion of the images based on said first and second objective optical systems, said first and second imaging devices having different numbers of picture elements;
   a driving signal generating means for mixing outputs generated to at least one of a signal regardless of said number of said picture elements in said solid state imaging devices, and of another signal in accordance with said number of said picture elements of said imaging devices, and said driving signal generating means further outputting a driving signal containing a horizontal transfer clock signal with a given frequency for each of said first and second solid state imaging devices even if said number of said picture elements of said first and second solid state imaging devices are different to thereby produce said driving signal to each of said solid state imaging devices;
   a picture signal processing means for performing signal processing of the signal read from each of said first and second solid state imaging devices using said driving signal applied thereto to produce a given picture signal; and
   a monitor means for displaying said given picture signal.

2. An endoscope signal processing apparatus comprising:
   a driving signal generating means in which each of first and second endoscope means respectively using as imaging means first and second solid state imaging devices having different numbers of picture elements can be mounted and which outputs a driving signal containing a horizontal transfer clock with a given frequency to said first and second solid state imaging devices regardless of differences in said numbers of said picture elements; and
   a picture signal processing means which performs signal processing of the signal output from each of said first and second solid state imaging devices using said driving signal applied thereto to produce a given picture signal.

3. An apparatus according to claim 1, wherein at least one of said first and second endoscope means has first and second light projection means, and is an electronic scope in which said first and second solid state imaging devices are respectively disposed at the positions of image formation of said first and second objective optical systems.

4. An apparatus according to claim 1, wherein at least one of said first and second endoscope means has first and second light projection means, and is an endoscope with an outer television camera having a fiberscope including an image guide for transmitting the image based on each of said first and second objective optical systems, and a television camera mounted on said fiberscope and wherein each of said first and second solid state imaging devices is disposed at the position of image formation of the image transmitted by said image guide means.

5. An apparatus according to claim 3 or 4, wherein at least one of said first and second light projection means has a projection end disposed at one end of said first or second insertion portion and is composed of a light guide means for transmitting illuminating light, said illuminating light being supplied to the incidence end of said light guide means from a light source means.

6. An apparatus according to claim 3 or 4, wherein at least one of said first and second light projection means comprises of a lamp disposed at the end of said first or second insertion portion.

7. An apparatus according to claim 5, wherein said light source means employs a surface sequential type of illumination and comprises a lamp, a rotary color filter provided with a plurality of color transmitting filters which respectively transmit light with different wavelength regions, and a motor for rotating said rotary color filter.

8. An apparatus according to claim 3 or 4, wherein said driving signal generating means comprises a horizontal transfer clock generating means for generating said horizontal transfer clock, a gate means for opening or closing a gate for said horizontal transfer clock to output a row of horizontal transfer clocks, a means for changing the number or said horizontal transfer clocks used for selectively changing over the period of opening and closing of said gate, and a vertical transfer generating means for generating a vertical transfer clock at the time said gate is closed.

9. An apparatus according to claim 8, wherein said driving signal generating means has a means for generating a clock for transfer between said horizontal transfer registers subsequently to said vertical transfer clock when said gate is closed.

10. An apparatus according to claim 3 or 4, wherein said first and second light projection means has a means for changing the exposure time of each of said solid state imaging devices in accordance with said number of said picture elements.

11. An apparatus according to claim 3 or 4, wherein said first and second endoscope means respectively have information sources with respect to said numbers of said picture elements of said first and second solid state imaging devices.

12. An apparatus according to claim 11, wherein said driving signal generating means and said picture signal processing means are contained in a signal processing apparatus having a connection portion that enables said first or second endoscope means to be connected thereto and a decoding means for decoding the information of said information source when said first or second endoscope means is connected.

13. An apparatus according to claim 3 or 4, wherein said picture signal processing means does not change the characteristics of the entire processing system for processing picture signals even if said numbers of said picture elements are different.

14. An apparatus according to claim 11, wherein said picture signal processing means has a means for changing characteristics which is capable of changing said characteristics used for picture signal processing in accordance with said numbers of said picture elements.

15. An apparatus according to claim 11, wherein said first and second light projection means has a switching means for switching the exposure time in accordance with said number of said picture elements of said first and second solid state imaging devices.

16. An apparatus according to claim 11, wherein said picture signal processing means has a switching means for switching the characteristics of the picture signal processing system for processing picture signals in accordance with said numbers of said picture elements of said first and second solid state imaging devices.

17. An apparatus according to claim 15, wherein said switching means is capable of manual switching.

18. An apparatus according to claim 15 further comprising a decoding means for decoding said information of said information source so that said switching means performs automatic switching using the switching signal which is output from said decoding means and applied thereto.

19. An apparatus according to claims 1 or 2, wherein said drive signal generating means has a filter which transmits only the basic wave of said horizontal transfer clocks and the harmonic wave thereof.

20. An apparatus according to claim 1 or 2, wherein said picture signal processing means has a first low-pass filter means for cutting off unnecessary harmonics, an A/D converting means for performing A/D conversion of a signal which was passed through said filter means, a digital memory means in which digital signals passed through said A/D converting means are stored, a D/A converting means for performing D/A conversion of the digital signals read from said memory means, and a second low-pass filter means for cutting off the harmonics of the analogue signals output from said D/A converting means.

21. An apparatus according to claim 20 further comprising a means for changing at least one of the clock used for reading from said digital memory means, the D/A conversion rate of said D/A converting means, and the frequency of cutting off by said second low-pass filter means.

22. An apparatus according to claim 21, wherein said picture signal processing means has an outline enhancing means for performing outline enhancement in front of or behind said second low-pass filter means and a means for switching the frequency of said outline enhancement by said outline enhancing means.

23. An apparatus according to claim 6 further comprising a means for changing the amount of light emitted from said lamp.

24. An apparatus according to claim 1 or 2, wherein said driving signal generating means serves to change the clock numbers of said horizontal transfer clock in accordance with said numbers of said picture elements.

25. An apparatus according to claim 1 or 2, wherein said driving signal generating means has a means for generating said horizontal transfer clocks which does not change the clock number of said horizontal transfer clock even if said numbers of said picture elements of said solid state imaging devices are different from each other.

26. An apparatus according to claim 25, wherein said means for generating said horizontal transfer clock outputs a clock row of a clock number greater than the maximum of horizontal picture elements in said first and second imaging devices.

27. An apparatus according to claim 26, wherein said means for generating said horizontal transfer clock signal outputs a clock sequence of a number greater than the maximum number of the vertical picture elements.

28. An apparatus according to claim 1 or 2, wherein said driving signal generating means has a means for generating a vertical transfer clock signal with a given period at the same time as a row of said horizontal transfer clock signal with a given frequency.

29. An apparatus according to claim 1 or 2, wherein said driving signal generating means has a plurality of means for generating said horizontal transfer clocks when said first or second solid state imaging device has a plurality of horizontal transfer registers.

30. An apparatus according to claim 1 or 2, wherein said driving signal generating means has a means for generating a signal for transfer between registers in correspondence with the case in which said first or second solid state imaging device has said plurality of said horizontal transfer registers.

31. An apparatus according to claim 16, wherein said switching means is capable of manual switching.

32. An apparatus according to claim 16 further comprising a decoding means for decoding said information of said information source so that said switching means performs automatic switching using the switching signal which is output from said decoding means and applied thereto.

* * * * *

UNITED STATES PATENT AND TRADEMARK OFFICE
CERTIFICATE OF CORRECTION

PATENT NO. : 4,926,258

DATED : May 15, 1990

INVENTOR(S) : SASAKI et al

It is certified that error appears in the above-identified patent and that said Letters Patent is hereby corrected as shown below:

On the cover page, Item [30], should read
"Apr. 7, 1988 [JP]   Japan ................ 63-86377".

Signed and Sealed this

Twelfth Day of November, 1991

Attest:

HARRY F. MANBECK, JR.

*Attesting Officer*           *Commissioner of Patents and Trademarks*